(No Model.)

S. P. MOULTON.
CAR COUPLING.

No. 277,918. Patented May 22, 1883.

WITNESSES
W. J. Cambridge
Chas. E. Griffin

INVENTOR
Susan Payson Moulton
per P. Teschemacher
Atty

UNITED STATES PATENT OFFICE.

SUSAN P. MOULTON, OF SALEM, MASSACHUSETTS.

CAR-COUPLING.

SPECIFICATION forming part of Letters Patent No. 277,918, dated May 22, 1883.

Application filed March 7, 1883. (No model.)

*To all whom it may concern:*

Be it known that I, SUSAN PAYSON MOULTON, of Salem, in the county of Essex and State of Massachusetts, have invented certain Improvements in Car-Couplings, of which the following is a full, clear, and exact description, reference being had to the accompanying drawings, making part of this specification, in which—

Figure 1:
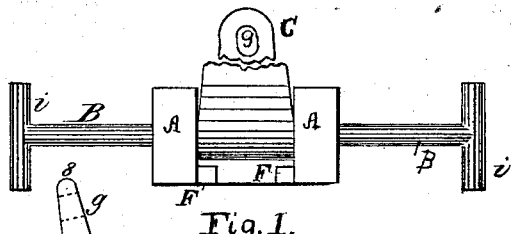
Figure 2:
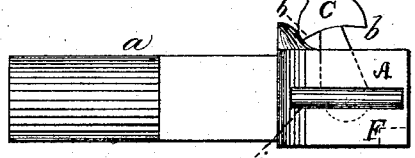
Figure 3:
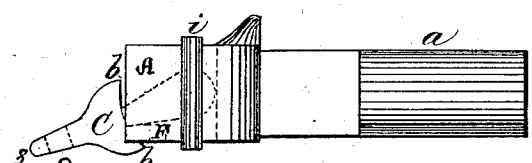
Figure 4:
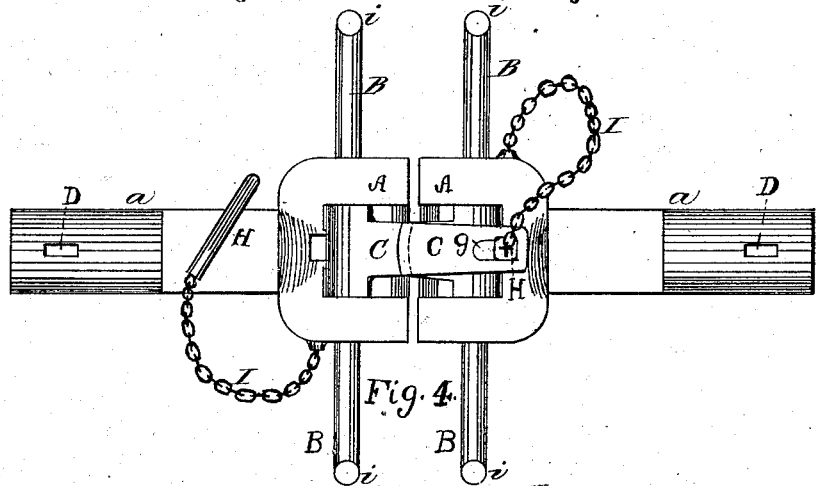
Figure 5:
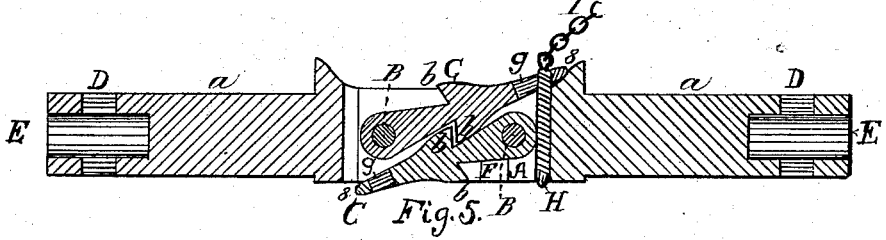
Figure 6:
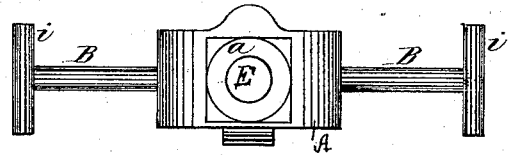

Figure 1 is a front elevation of the draw-head of a railway-car having my improvements applied thereto. Fig. 2 is a side elevation of the same with its double coupling-hook swung up. Fig. 3 is a similar elevation with the coupling-hook thrown down. Fig. 4 is a plan representing two of my improved draw-heads coupled together. Fig. 5 is a longitudinal vertical section through the center of the same. Fig. 6 is a rear elevation of one of my draw-heads.

My invention has for its object to provide an automatic car-coupling of simple construction which will not be liable to get out of order, and which may be easily operated from the side to uncouple the cars without the necessity of going between them; and my invention consists in the combination, with a draw-head provided with a double-pivoted hook or catch, of a horizontal shaft connected with the said double hook and extending out to the sides of the car into a convenient position to enable it to be turned by a suitable handle, whereby the hook can be raised to uncouple the cars without the necessity of going between them; and my invention furthermore consists in the combination, with the draw-head and its double-pivoted hook, of a pin adapted to pass down through an aperture in the end of the coupling-hook of the opposite draw-head and between the draw-head and the rear end of its hook, or into an aperture made for its reception in the draw-head, whereby the hook is securely confined in place when coupled against any tendency to be thrown up by the jar or jolting of the car while in motion.

In the said drawings, A represents the draw-head of a railway-car, the shank *a* of which is adapted to be secured to the draw-bar of an ordinary car, which enters the socket E, Fig. 5, and is confined therein by means of a bolt or key passing through a slot or aperture, D, in the shank *a* and a corresponding hole in the draw-bar.

Between the bifurcations of the draw-head A is pivoted, at its inner end, by means of a horizontal shaft, B, a double hook or catch, C, having its front portion made in the form of a wedge, and provided on both its upper and lower sides with an inwardly-inclined hook, *b*, which is adapted to engage with the corresponding hooked portion of the catch C of the opposite draw-head when the two heads are brought together, as seen in Fig. 5, thus securely coupling the cars together. The hook C when down in the position seen in Fig. 3, rests on stops F, projecting from the inside of the draw-head, which serve to support the hook and prevent it from dropping below its proper operative position. Any other suitable stop or stops may, however, be employed. For instance, a stop may be applied to the shaft B, to which the hook is secured.

By providing the pivoted catches C with hooks *b* both on the upper and lower sides, each catch is adapted to engage with the opposite one by passing either above or below the same, according as one draw-head may be above or below the level of the other, as frequently occurs in different cars; the hook C, which is highest, always riding up the inclined or wedge-shaped surface of the lower one until the under hook *b* of the one drops over the upper hook *b* of the other, the extreme ends S of these catches being always rounded to insure their passing each other in case they should be on exactly the same level. Furthermore, the construction of the catch with its double hook insures the coupling of one car with either end of another car provided with a similar device. Each of the double hooks or catches C is provided, near its point or outer end, with an aperture, *g*, and when the cars are coupled together by the engagement of the two double hooks, as seen in Fig. 5, a pin, H, secured to the draw-head by a chain, I, is passed, if desired, through the aperture *g* of the uppermost hook C, and thence pushed or dropped down between the draw-head and the rear end of the other hook C, or into a suitable aperture made for its reception in the draw-head, by which means the upper hook C is securely fastened in place and prevented from being thrown up out of engagement with the lower hook by the jar or jolting of the car while in motion. This aperture $g$ is also used when a car having my improved coupling applied thereto is to be attached to one provided with a draw-head of the ordinary construction, in which case the hook C, on entering the old draw-head, is secured therein by dropping the pin H or a common coupling-pin down through the aperture $g$. Should one of the hooks C be up in the position seen in Fig. 2, the concussion produced by the contact of the two draw-heads as the cars are brought together will insure its being thrown forward sufficiently to cause it to drop by its own weight into a proper position to engage with the opposite hook.

The horizontal shaft B, to which the double hook C is securely fastened, has its bearings in the bifurcations of the draw-head, and extends out on both sides thereof to or nearly to or just beyond the sides of the car, where it is provided with handles $i$, to enable it to be conveniently grasped and turned by the hand in order to raise the hook or catch C, and thus disengage it from the opposite hook C, thereby affording a ready means of uncoupling the cars without the necessity of going between them, and avoiding all danger of accidents from this cause.

What I claim as my invention, and desire to secure by Letters Patent, is—

1. In a car-coupling, the combination, with the draw-head A and the double wedge-shaped hook or catch C, pivoted within the same and supported in an operative position by a stop or stops, of the horizontal shaft B, secured to the said hook C, and extending out to the sides of the car, to enable the hook to be raised to uncouple the cars by the turning of the shaft, all constructed and arranged to operate substantially in the manner and for the purpose described.

2. In a car-coupling, the combination, with the draw-head A and the double wedge-shaped hook or catch C, pivoted within the same and supported in an operative position by a stop or stops, and having at or near its outer end an aperture, $g$, of the pin H, adapted to pass through the aperture $g$ down between the draw-head and the rear end of its hook, or into an aperture in the draw-head made for its reception, substantially as and for the purpose set forth.

Witness my hand this 3d day of March, A. D. 1883.

SUSAN PAYSON MOULTON.

In presence of—
   P. E. TESCHEMACHER,
   W. J. CAMBRIDGE.